(12) United States Patent
van Eyck

(10) Patent No.: US 6,386,800 B1
(45) Date of Patent: May 14, 2002

(54) METHOD AND A DEVICE FOR TRANSPORTING BULK MATERIAL

(75) Inventor: Joris Julius Josephus van Eyck, Geel (BE)

(73) Assignee: Q-Engineering BVBA (BE)

( * ) Notice: Subject to any disclaimer, the term of this patent is extended or adjusted under 35 U.S.C. 154(b) by 0 days.

(21) Appl. No.: 09/445,791

(22) PCT Filed: Jun. 9, 1998

(86) PCT No.: PCT/EP98/03720

§ 371 Date: Feb. 15, 2000

§ 102(e) Date: Feb. 15, 2000

(87) PCT Pub. No.: WO98/56696

PCT Pub. Date: Dec. 17, 1998

(30) Foreign Application Priority Data

Jun. 12, 1997 (NL) .............................................. 1006299

(51) Int. Cl.[7] ................................................ B65G 53/04
(52) U.S. Cl. .............................. 406/95; 406/14; 406/92; 406/146
(58) Field of Search ............................. 406/14, 92, 95, 406/146

(56) References Cited

U.S. PATENT DOCUMENTS

| 4,909,676 A | * | 3/1990 | Heep et al. ..................... 406/14 |
| 5,071,289 A | * | 12/1991 | Spivak .......................... 406/11 |
| 5,240,355 A | * | 8/1993 | Hudalla ......................... 406/95 |
| 5,584,612 A | * | 12/1996 | Nolan ........................... 406/11 |
| 6,106,202 A | * | 8/2000 | Nolan ........................... 406/95 |
| 6,200,071 B1 | * | 3/2001 | Karasawa .................... 406/194 |

FOREIGN PATENT DOCUMENTS

| DE | 1781025 | 8/1970 | |
| DE | 1900355 | 9/1970 | |
| DE | 2412142 | 9/1974 | ........... B65G/53/58 |
| EP | 0 446 520 A2 | 9/1991 | ............. F23K/3/02 |

* cited by examiner

Primary Examiner—Christopher P. Ellis
Assistant Examiner—Joe Dillon, Jr.
(74) Attorney, Agent, or Firm—Ira D. Finkelstein; Howrey Simon Arnold & White, LLP

(57) ABSTRACT

A method and device for pneumatically transporting bulk material including a plurality of supply elements spaced along a conveyor line. These elements provide an additional gaseous medium as a booster fluid. The supply elements are automatically and individually controlled via velocity measurements taken near the elements.

16 Claims, 4 Drawing Sheets

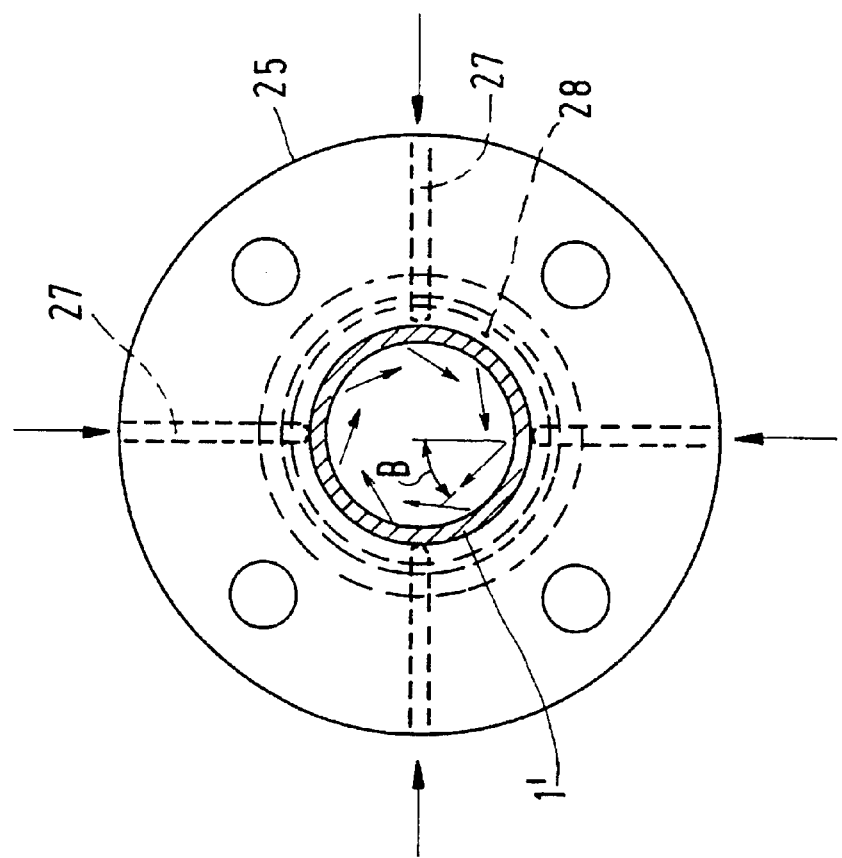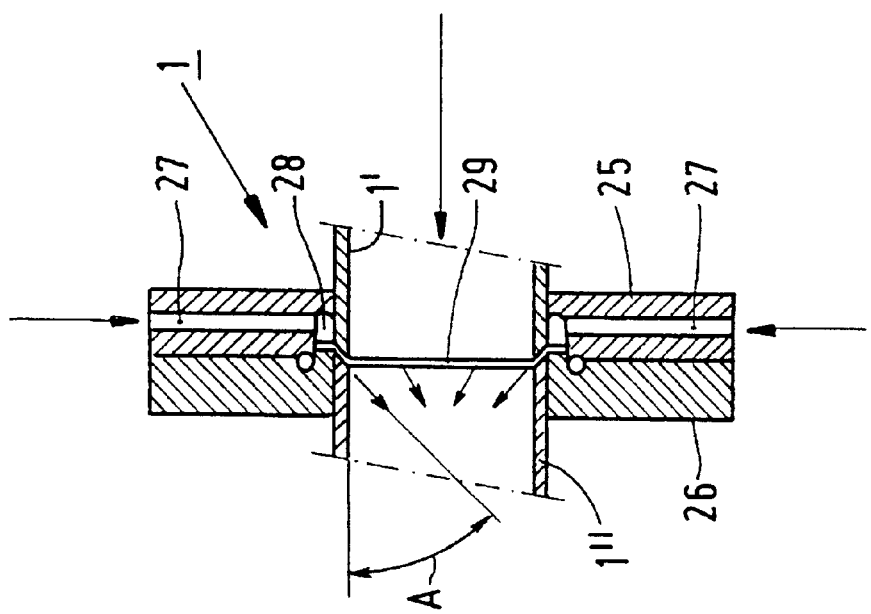

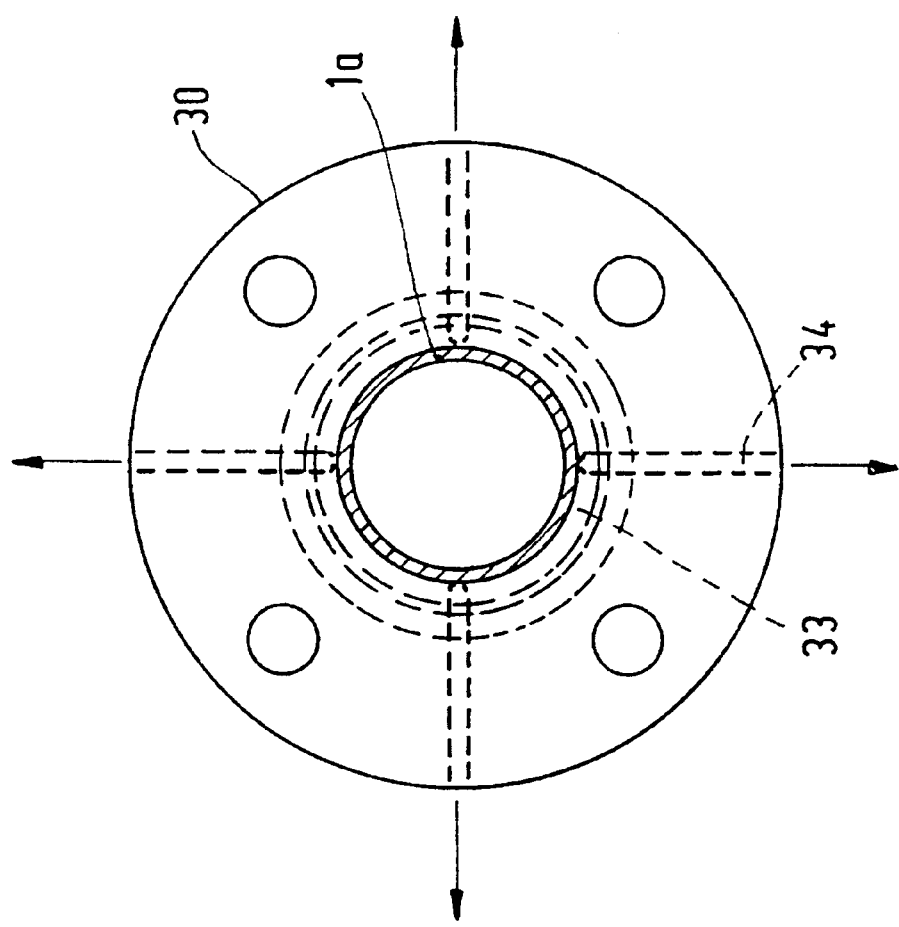
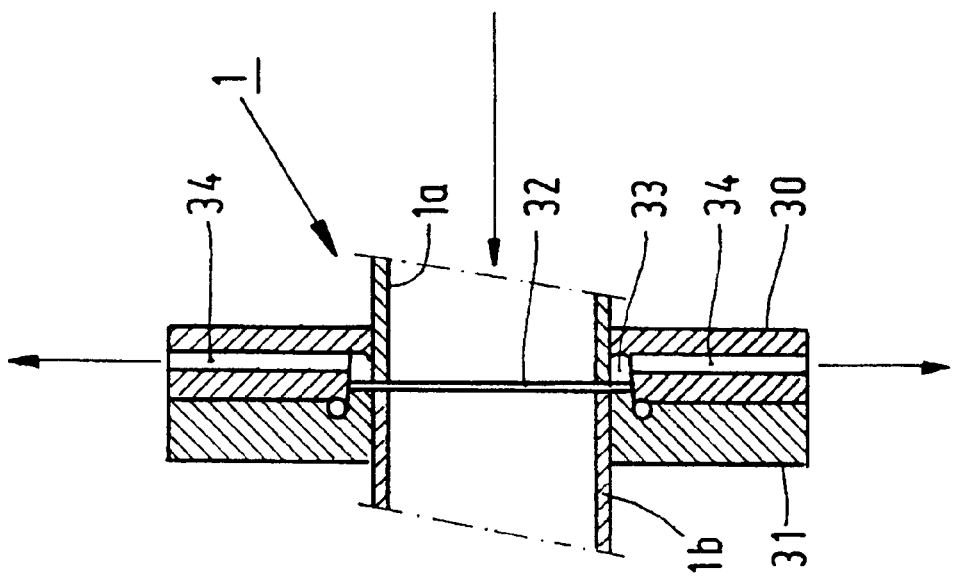
FIG. 7
FIG. 6

METHOD AND A DEVICE FOR TRANSPORTING BULK MATERIAL

The invention relates to a method for transporting bulk material, granular material or powdery material through a conveyor line from an inlet, where the powdery material is forced into the line by means of a pressurized gaseous medium, to an outlet, wherein several supply elements are connected to the conveyor line between said inlet and said outlet for the purpose of introducing additional pressurized gaseous medium into the conveyor line.

A method of this kind can be derived from U.S. Pat. No. 5,240,355.

With the device which is described and depicted in said U.S. patent, the conveyor line is subdivided into a number of sections, to each of which a number of supply elements are connected. The adjustment of each supply element must be carried out by hand, whereby the individual supply elements may be adjusted differently from each other. In addition to that, depending on the operating conditions, the adjustment of the supply elements which are connected to each section can be changed simultaneously for all of said supply elements, whilst maintaining the possible differences in the adjustment of the individual supply elements.

From European patent No. 0 446 520 a device for feeding several burners with powdery coal is known, wherein a mixture of air and powdery coal is supplied to each burner via a separate pipe. It is intended thereby to supply an identical amount of powdery coal per unit time to each burner via the various pipes. The flow value of the mixture of coal and air is measured in a first pipe portion for the purpose of controlling the flow in a pipe. Furthermore, the flow value of the air is measured in a pipe portion further downstream. On the basis of these two measurements, which are carried out at locations some distance apart in the pipe, pressurized air is led into the upstream portion of the pipe.

German patent application No. 2,412,142 furthermore discloses a device for transporting powdery material via a line, into which air can be blown through a number of spaced-apart injectors. The introduction of air into the line via the injectors can be controlled by means of a control programme, for example in order to effect a pulsating transport of the material through the conveyor line. Means for measuring the velocity in the pipe are not shown or described in said patent application.

German patent application No. 1,900,355 discloses a device for transporting spaced-apart balls of material through a pipe. Valves are thereby connected to the pipe in regularly spaced-apart relationship, via which valves pressurized air can be introduced into the pipe. The movement of the balls of material through the pipe is detected by light boxes disposed near said valves, via which the valves are controlled. Pressure gauges are furthermore provided near the connections of the valves to the pipes, by means of which the supply of air to the valves can be influenced. A similar device is described in German patent application No. 1,781,025.

The object of the invention is to provide a method of the above kind, wherein the transport of the material through the conveyor line can be automatically controlled in an optimum manner during operation.

According to the invention this can be achieved in that the velocity of the material through the conveyor line is measured near the connection of each supply element for introducing additional pressurized gaseous medium into the conveyor line, and in that the introduction of pressurized gaseous medium via the respective supply element is automatically controlled in dependence on the velocity that is detected.

The use of the method according to the invention makes it possible to achieve an optimum control of the transport of the material. The adjustment of the supply elements can be automatically adapted thereby to different types of material having different physical properties, which are to be transported through the same conveyor line. Also changes in the path to be followed through the pipe system, for example if several outlets must be reached, will not affect the optimum manner in which the material is being transported and/or necessitate outside interference by the user of the device.

The method according to the invention can be carried out efficiently by using a device comprising a conveyor line which is provided with an inlet, with an outlet, and with supply elements connected to said conveyor line between said inlet and said outlet, which supply elements function to introduce additional pressurized gaseous medium into the conveyor line, wherein according to the invention a measuring element for measuring the velocity of the material through the conveyor line is disposed near the connection of each supply element to the conveyor line, and wherein means for adjusting the supply element in dependence on the velocity of the material through the conveyor line that has been detected by means of said measuring element are provided between the supply element and the measuring element in question.

It is noted that the gaseous medium may be air or a suitable gas.

The invention will be explained in more detail below with reference to the accompanying figures.

FIG. 1 diagrammatically shows an arrangement of a device according to the invention.

FIG. 2 diagrammatically shows the arrangement of a supply element for introducing a pressurized gaseous medium into a conveyor line, with measuring elements disposed near said supply element.

FIG. 4 is a sectional view of an embodiment of an element for introducing pressurized air into a conveyor line.

FIG. 5 is a side view of FIG. 4.

FIG. 6 is a sectional view of a discharge element for discharging air from the conveyor line.

FIG. 7 is a side view of FIG. 6.

Figure 1:
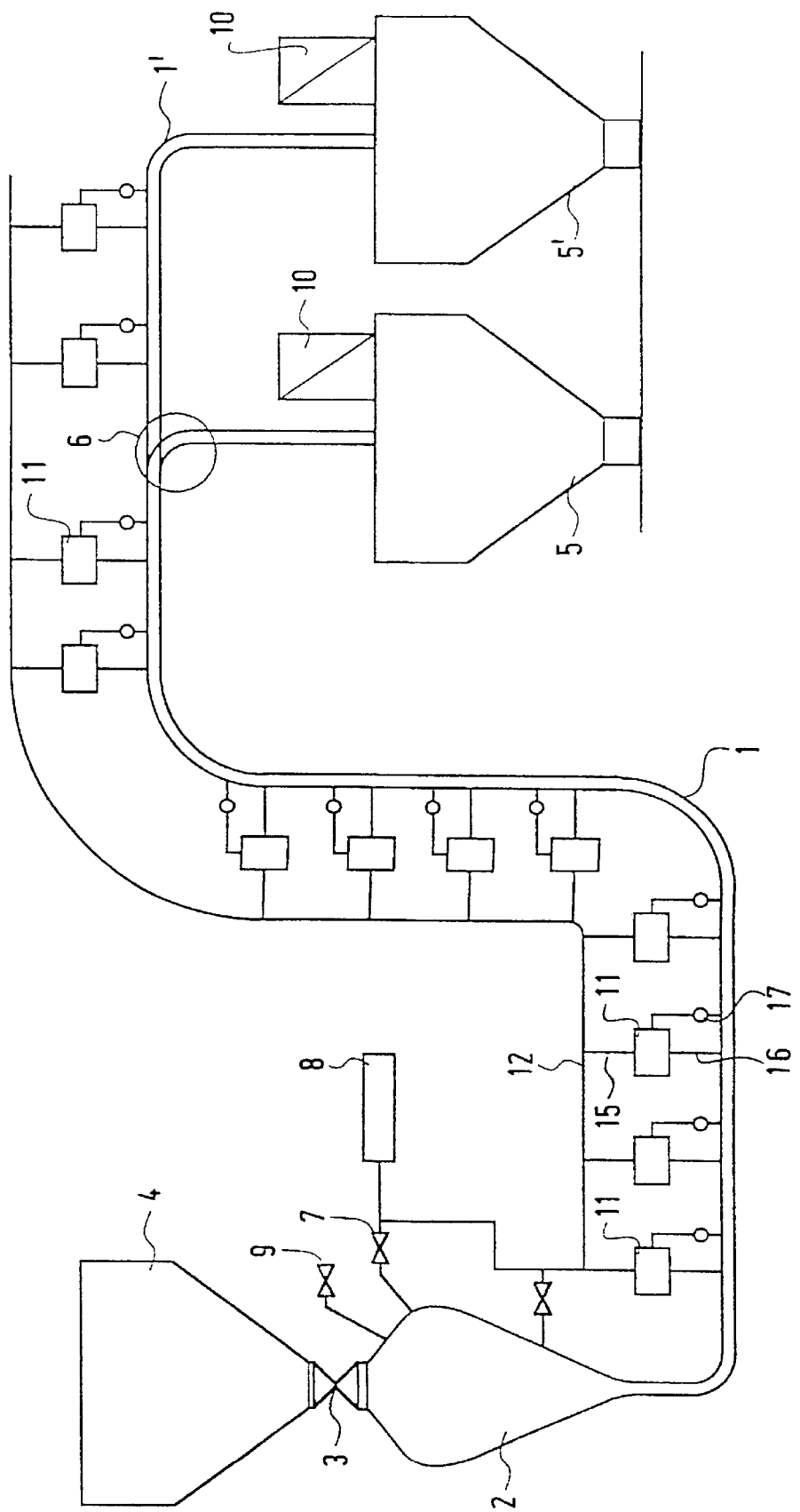

As is shown in FIG. 1, a vessel 2 is connected to an inlet of a conveyor line 1. Vessel 2 is connected to a hopper 4 via a sluice mechanism 3 or the like. Furthermore, means for weighing vessel 2 may be provided.

Near its end (or outlet) remote from vessel 2, line 1 is connected to a storage vessel or hopper 5. Line 1 may be connected, via a change-over valve 6 (diagrammatically indicated), to an extension 1' of said line, via which material to be transported can be supplied to a further hopper 5'. It is also possible, of course, to provide more hoppers or the like for the storage of material.

Granular or powdery material which is to be transported can be supplied from hopper 4 to vessel 2 via sluice mechanism 3. After closure of the sluice mechanism 3, a pressurized gaseous medium can be introduced into vessel 2, via a valve 7 or the like, from a source 8 of pressurized gaseous medium, for example air, for the purpose of transporting the material through line 1 to hopper 5 and/or hopper 5'.

Once the amount of material present in vessel 2 has been carried off, the pressure in vessel 2 can be released by opening a valve 9, after which vessel 2 can be refilled.

Hoppers 5 and 5' are provided with filters 10, via which a gaseous medium, which has been used for the transport of the material, can escape from said hoppers.

As is furthermore diagrammatically indicated in FIG. 1, a number of control mechanisms 11 are connected to conveyor line 1 between said inlet and said outlet. Said control mechanisms 11 are also connected to a line which is connected to a source 8 for pressurized gaseous medium.

Figure 2:
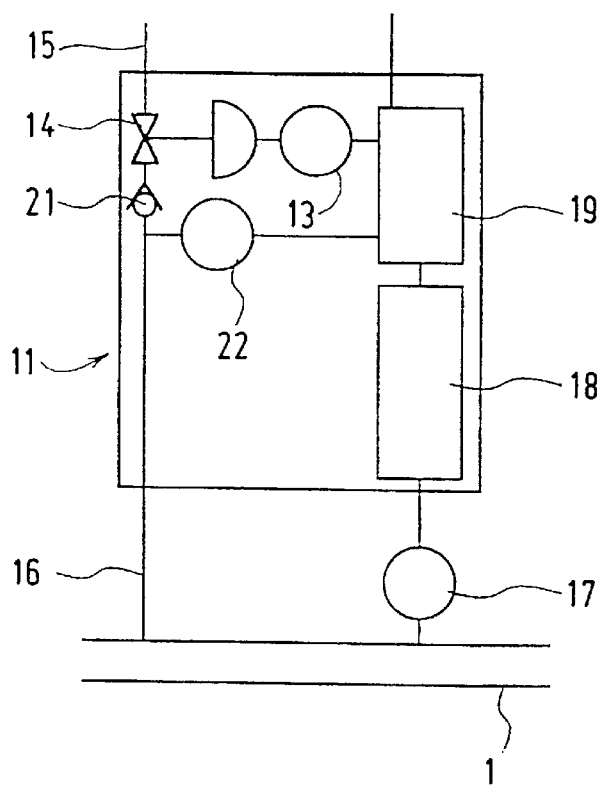

As is shown in more detail in FIG. 2, such a control mechanism 11 comprises a supply element 13 for introducing a pressurized gaseous medium into conveyor line 1. Said supply element 13 comprises a valve 14, which is connected to line 12 via a line 15, and which is connected to line 1 via a line 16. Near the point where supply element 13 is connected to conveyor line 1 for introducing a pressurized medium into said conveyor line 1, more in particular near the point where line 16 is connected to line 1, a measuring element 17 is connected to said line, by means of which measuring element 17 the velocity of the material through line 1 can be measured.

It is preferred to use sonometry for measuring the velocity of the material in line 1, whereby the collision of material particles with each other and with the wall of the line can be detected by means of a microphone which is connected to the wall of conveyor line 1, on the basis of which detection the velocity of the material through conveyor line 1 can be determined. This is a technique which is known per se, so that it will not be necessary to discuss it in detail herein.

Figure 3:
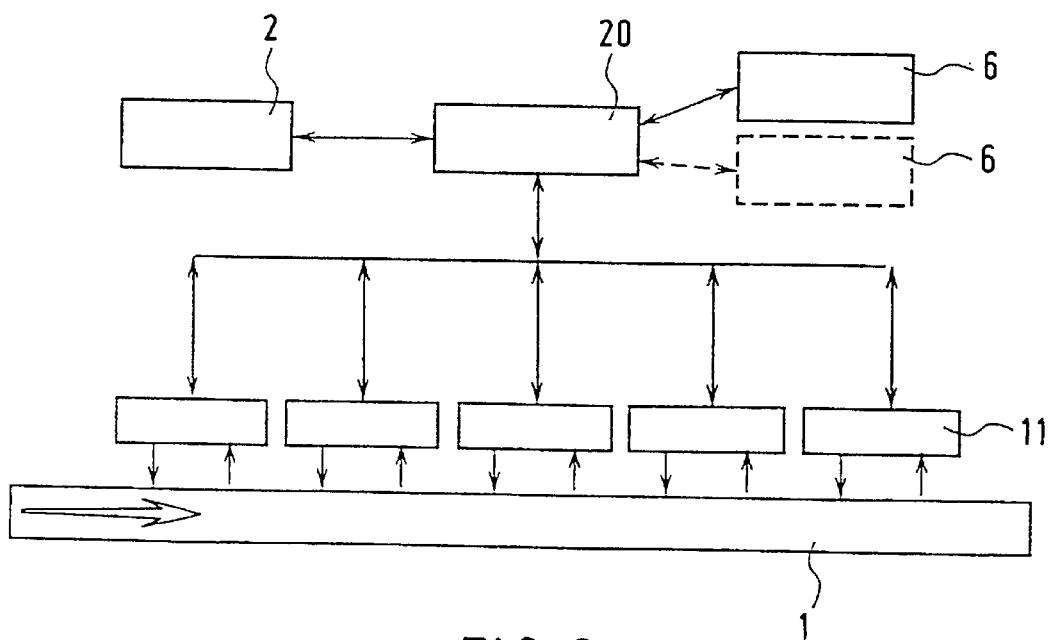
FIG. 3 shows a block diagram of a conveyor line and elements associated therewith.

A signal which has been obtained by measuring element 17 in dependence on the detected velocity is supplied, via a signal processing device 18, which may amplify said signal, to a control element 19, by means of which the adjustment of the respective supply element 13 for introducing a pressurized gaseous medium into conveyor line 1 can be influenced. As is shown in FIG. 3, the control mechanisms 11, more in particular control elements 19, are connected to a central control unit 20, which may comprise a computer or the like.

A pressure gauge 22 is connected to line 16 downstream of a non-return valve 21, which is mounted in line 16 between valve 14 and conveyor line 1. Pressure gauge 22 is also connected to control element 19. Pressure gauges 22 are capable of providing signals regarding the pressures that prevail at the various connecting points of the supply elements 13 to conveyor line 1. Also these data will be fed to central control unit 20.

Pressure gauges mounted on vessel 2, which measure the pressure in said vessel as well as the degree of filling of the vessel, are likewise connected to central control unit 20. Also the position of the change-over valve(s) 6 that may be provided can be controlled by means of unit 20.

When using the above-described device, the amount of pressurized medium being introduced into conveyor line 1 will be controlled near all the connecting points of the supply elements 13 by means of which a pressurized medium is introduced into conveyor line 1, and that in dependence on the velocity of the material through conveyor line 1 at the location of the respective supply elements 13, by using the associated control mechanisms 11. The operation of a control mechanism 11 can be influenced via the respective control element 19 by means of central control unit 20. Said central control unit 20 may also be fed with data concerning the pressures that prevail at the various connecting points of supply elements 13 to conveyor line 1, in dependence on which the operation of the various control elements 19 may be influenced again, possibly by means of central control unit 20, so as to avoid undesirable pressure differences at various points in conveyor line 1.

Thus, an even, continuous transport of the material from the inlet to the outlet of conveyor line 1 can be effected by using the device.

A suitable embodiment for a supply element for introducing pressurized air into line 1 is shown in more detail in FIGS. 4 and 5. In this embodiment two line portions 1' and 1" of line 1 are attached together by means of flanges 25 and 26 which are secured to the respective line portions 1' and 1". In the illustrated embodiment, the upstream flange 25 is provided with four radially extending, equally spaced bores 27, which open into a circular groove 28 provided in flange 25, which extends round the end of line portion 1'.

During operation, the air being supplied via line 16 is supplied, via bores 27, to the circular groove 28 as indicated by arrows, from where the air flows into the interior of line 1 via a gap 29 between the facing ends of line portions 1' and 1". As will be apparent from the figure, the boundary surfaces of the facing ends of line portions 1' and 1" are located on the face of a cone, whose top angle is located downstream of the facing ends of line portions 1' and 1", seen in the direction of movement of the material through line 1. Consequently, the air flows from gap 29 into the interior of line 1 at an angle A with respect to the longitudinal axis of line 1. This has an efficacious effect on the transport of the material through the line and on the realisation of a separation between the material and the inner wall of line 1.

Said effect can be further enhanced by introducing the airflow more or less tangentially into the conveyor line, as is indicated by means of angle B in FIG. 5. This can for example be effected by providing grooves which extend obliquely with respect to the longitudinal axis of line 1 in one or both boundary surfaces of recess 28, which extend centrically round the central axis of line 1.

Furthermore it has become apparent that the transport of the material through transport line 1 can be influenced advantageously by discharging air from conveyor line 1 directly upstream of the connecting point of one or more lines 16 to conveyor line 1. This can be effected in an efficient manner by means of a discharge element as shown in FIGS. 6 and 7. As is apparent from said figures, two line portions 1a and 1b of the line are attached together by means of two flanges 30 and 31, in such a manner that a gap 32 is present between the facing ends of said line portions 1a and 1b. Said gap is in communication with a groove 33 provided in flange 30, and surrounding line portion 1a. Groove 33 is in communication with four bores 34, which radially extend through flange 30.

It will be apparent, that air can flow out of line 1 via gap 32, groove 33 and bores 30 during operation, as is indicated by arrows in FIGS. 6 and 7. The provision of said discharge element makes it possible for air which has been introduced into line 1 via a line 16, upstream of said discharge element, and which has expanded in the line portion between said line 16 and said discharge element, to be discharged via said discharge element before new air is introduced into conveyor line 1 via a line 16 which is connected to conveyor line 1 directly downstream of the respective discharge element. It has become apparent that a very effective control of the velocity of the material during its transport through conveyor line 1 can be realised in this manner. The air which is discharged via bores 34 may be supplied, via a closed system of lines, to the compressor or the like by means of which air is compressed for being supplied via lines 16, thus making it possible to realise a closed system for the gaseous medium, which is utilized for transporting material through conveyor line 1.

It stands to reason that variations and/or modifications to the above-described embodiments are conceivable.

Instead of using two line portions 1' and 1" and 1a and 1b respectively, it is for example also possible to use one continuous conveyor line, which comprises a large number of bores, which extend through the wall of conveyor line 1, instead of gaps 29 and 31 respectively. In such a case it will not be necessary to use two separate flanges 25, 26 and 30, 31 respectively, but it will For example suffice to use one disc surrounding conveyor line 1.

What is claimed is:

1. A method for pneumatically transporting bulk material through a conveyor line from an inlet to an outlet, comprising:

forcing the material into the line using a pressurized gaseous medium;

introducing additional pressurized gaseous medium into the conveyor line through supply elements connected to the conveyor line at connection points between said inlet and said outlet;

measuring the velocity of the material through the conveyor line near the connection point of each supply element; and automatically controlling the introduction of pressurized gaseous medium via the respective supply element in dependence on the velocity that is measured.

2. A method according to claim 1, wherein measuring the velocity of the material through the conveyor line comprises measuring said velocity by sonometry.

3. A method according to claim 1, wherein said gaseous medium is introduced into the conveyor line in an intended direction of movement of the material through said conveyor line at an angle deviating from 90°.

4. A method according to claim 1, wherein said gaseous medium is introduced into said conveyor line in a substantially tangential direction.

5. A method according to claim 1, wherein the introduction of said gaseous medium into the conveyor line takes place in an evenly distributed manner over the circumference of said conveyor line.

6. A method according to claim 1, further comprising discharging gaseous medium from the conveyor line directly upstream of a connection point.

7. A method according to claim 6, wherein said discharge of gaseous medium from the conveyor line takes place in an evenly distributed manner over the circumference of said conveyor line.

8. A method according to claim 1, wherein measuring the velocity of the material comprises detecting said velocity with a measuring element that generates a signal and supplying said signal to a control element to influence a position of the respective supply element.

9. A method according to claim 1, further comprising sending control signals to the control elements associated with the various supply elements from a central control unit.

10. A method according to claim 9, further comprising measuring the pressure in said conveyor line near the connection point of a supply element to said conveyor line, generating a signal corresponding to said measured pressure, and supplying said signals to the central control unit.

11. A method according to claim 10, wherein the signals generated corresponding to the measured pressure are supplied to the central control unit via the control elements of said supply elements.

12. A device which pneumatically transports bulk material, comprising:

a pneumatic conveyor line having an inlet and an outlet;

means for forcing said bulk material into the line by flow of a pressurized gaseous medium;

a plurality of supply elements connected to said conveyor line at points between said inlet and said outlet, which supply elements function to introduce additional pressurized gaseous medium into the conveyor line;

a measuring element which measuring the velocity of the material through the conveyor line disposed near the connection point of each supply element to the conveyor line, and means for adjusting the supply element in dependence on the velocity detected by said measuring element, said adjusting means disposed between the supply element and the respective measuring element.

13. A device according to claim 12, further comprising a control element disposed between each said measuring element and the respective supply element, wherein a signal generated by said measuring element influences said control element to adjust said supply element.

14. A device according to claim 12, wherein at least one of said supply elements supplies pressurized gaseous medium over the entire circumference of said conveyor line.

15. A device according to claim 12, further comprising a discharge element for discharging gaseous medium from said conveyor line directly upstream of at least one of said supply elements.

16. A device according to claim 15, wherein said discharge element discharges said gaseous medium from said conveyor line in an evenly distributed manner over the circumference thereof.

* * * * *